(12) United States Patent
Gezici et al.

(10) Patent No.: US 7,349,458 B2
(45) Date of Patent: Mar. 25, 2008

(54) LINEAR RECEIVERS FOR TIME-HOPPING IMPULSE RADIO SYSTEMS

(75) Inventors: Sinan Gezici, Princeton, NJ (US); Andreas F. Molisch, Arlington, MA (US); Hisashi Kobayashi, New Brunswick, NJ (US); H. Vincent Poor, Princeton, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 725 days.

(21) Appl. No.: 10/847,072

(22) Filed: May 17, 2004

(65) Prior Publication Data

US 2006/0146915 A1 Jul. 6, 2006

(51) Int. Cl.
*H04B 1/69* (2006.01)
(52) U.S. Cl. .................. 375/138; 375/136; 375/147; 375/148; 375/316; 375/347; 375/349
(58) Field of Classification Search ................ 375/138, 375/130, 316, 347, 341, 136, 147, 150
See application file for complete search history.

(56) References Cited

U.S. PATENT DOCUMENTS

| | | | |
|---|---|---|---|
| 6,686,879 B2* | 2/2004 | Shattil | 342/367 |
| 7,088,782 B2* | 8/2006 | Mody et al. | 375/260 |
| 7,099,422 B2* | 8/2006 | Hoctor et al. | 375/354 |
| 7,154,956 B2* | 12/2006 | Molisch et al. | 375/260 |
| 2002/0190786 A1* | 12/2002 | Yoon et al. | 329/313 |
| 2003/0227961 A1* | 12/2003 | Batra et al. | 375/147 |
| 2004/0240527 A1* | 12/2004 | Giannakis et al. | 375/138 |
| 2005/0003769 A1* | 1/2005 | Foerster et al. | 455/113 |
| 2005/0018750 A1* | 1/2005 | Foerster et al. | 375/130 |
| 2005/0090205 A1* | 4/2005 | Catreux-Erceg et al. | 455/78 |
| 2005/0105588 A1* | 5/2005 | Giannakis et al. | 375/130 |
| 2005/0141630 A1* | 6/2005 | Catreux et al. | 375/267 |
| 2006/0088080 A1* | 4/2006 | Cha et al. | 375/130 |

OTHER PUBLICATIONS

J Zhang, RA Kennedy, TD Abhayapala, Performance of RAKE reception for ultra wideband signals in a lognormal fading channel, IEEE 1st International Workshop of UWB Systems (IWUWBS'03), Oulu, Finland, Jun. 2003.*

Gezici, S. Kobayashi, H. Poor, H.V. Molisch, A.F., Optimal and suboptimal linear receivers for time-hopping impulse radio systems, Ultra Wideband Systems, 2004. Joint with Conference on Ultrawideband Systems and Technologies. Joint UWBST & IWUWBS. 2004 International Workshop on, May 18-21, 2004, on pp. 11-15.*

(Continued)

*Primary Examiner*—Shuwang Liu
*Assistant Examiner*—Kenneth Lam
(74) *Attorney, Agent, or Firm*—Dirk Brinkman; Clifton D. Mueller; Gene V. Vinokur (57) ABSTRACT

In a time-hopped impulse radio system, each symbol is transmitted over a channel having different multipath components as a set of $N_f$ frames. Each frame includes one pulse. All frames of a received signal corresponding to the symbol are sampled to generate $N_f \times L$ samples, where $L$ is the number of samples for each frame. Then, the $N_f \times L$ samples are combined according to a minimum mean square error criterion to obtain a decision variable corresponding to the symbol.

5 Claims, 6 Drawing Sheets

OTHER PUBLICATIONS

Bayesteh, A. Nasiri-Kenari, M., Iterative interference cancellation and decoding for a coded UWB-TH-CDMA system in multipath channels using MMSE filters, Personal, Indoor and Mobile Radio Communications, 2003. PIMRC 2003. 14th IEEE Proceedings on, Sep. 7-10, 2003, 1555-1559 vol. 2.*

E. Fishler and H. V. Poor, "On the tradeoff between two types of processing gain," *40th Annual Allerton Conference on Communication, Control, and Computing*, Monticello, IL, Oct. 2-4, 2002.

S. Gezici, H. Kobayashi, H. V. Poor, and A. F. Molisch, "Performance Evaluation of Impulse Radio UWB Systems with Pulse-Based Polarity Randomization in Asynchronous Multiuser Environments," *IEEE Wireless Communications and Networking Conference (WCNC'04)*, Atlanta, GA, Mar. 2004.

Y.-P. Nakache and A. F. Molisch, "Spectral shape of UWB signals influence of modulation format, multiple access scheme and pulse shape," *Proceedings on the IEEE Vehicular Technology Conference, (VTC 2003-Spring)*, vol. 4, pp. 2510-2514, Jeju, Korea, Apr. 2003.

J. Evans and D. N. C. Tse, "Large System Performance of Linear Multiuser Receivers in Multipath Fading Channels," *IEEE Trans. Inform. Theory*, IT-46 (6) :2059-2078, Sep. 2000.

* cited by examiner

LINEAR RECEIVERS FOR TIME-HOPPING IMPULSE RADIO SYSTEMS

FIELD OF THE INVENTION

The present invention relates generally to radio communication systems, and more particularly to receivers for ultra wide bandwidth (UWB) systems.

BACKGROUND OF THE INVENTION

With the release of the "First Report and Order," Feb. 14, 2002, by the Federal Communications Commission (FCC), interest in ultra wide bandwidth (UWB) communication systems has increased. UWB communication systems spread information over a wide bandwidth of at least 500 MHz. Due to this spreading operation, the power spectral density, and thus the interference to narrow bandwidth receivers is small.

For impulse radio signals, pulse-position modulation, (PPM) and pulse amplitude modulation (PAM) are the most popular signaling techniques. These techniques are combined with time hopping (TH) for multiple-access format. In TH, each symbol is represented by a series of 'basis pulses'. The locations or delays of the pulses are determined by a TH code at the transmitter. The TH hopping code is generated as a pseudo-random sequence.

In TH impulse radio, a set of frames ($N_f$) frames are allocated for each transmitted symbol. In each the frames of the set, one ultra-wideband pulse is transmitted during a chip interval. To recover the transmitted symbols from the pulses in the set of frames, samples from the set of frames need to be combined in order in order to achieve a lowest bit error probability (BEP).

It is desired to provide a linear receiver for a time-hopped, impulse radio system that combines samples of pulses received over a frequency selective channel optimally, in a multi-transmitter environment.

SUMMARY OF THE INVENTION

The invention provides a linear receiver for a time-hopping (TH) impulse radio systems. An optimal linear receiver according to the invention combines all samples from all frames and all multipath components, for a transmitted symbol, according a minimum mean square error (MMSE) criterion.

Due to the complexity of the optimal receiver, two additional receivers are provided.

An optimal frame combining (OFC) receiver optimally combines first samples from the set of frames, while combining different multipath components suboptimally. Then, the combined samples are recombined according to the MMSE criterion.

An optimal multipath combining (OMC) receiver optimal first combines the samples from different multipath components optimally, while combining the samples from the set of frames suboptimally. The combined samples are then recombined according to the MMSE criterion.

DETAILED DESCRIPTION OF THE PREFERRED EMBODIMENT

Signaling Mode

The receiver and method according to our invention is intended for a synchronous, binary phase shift keyed time-hopped, impulse radio (TH-IR) system with K transmitters.

Figure 1:
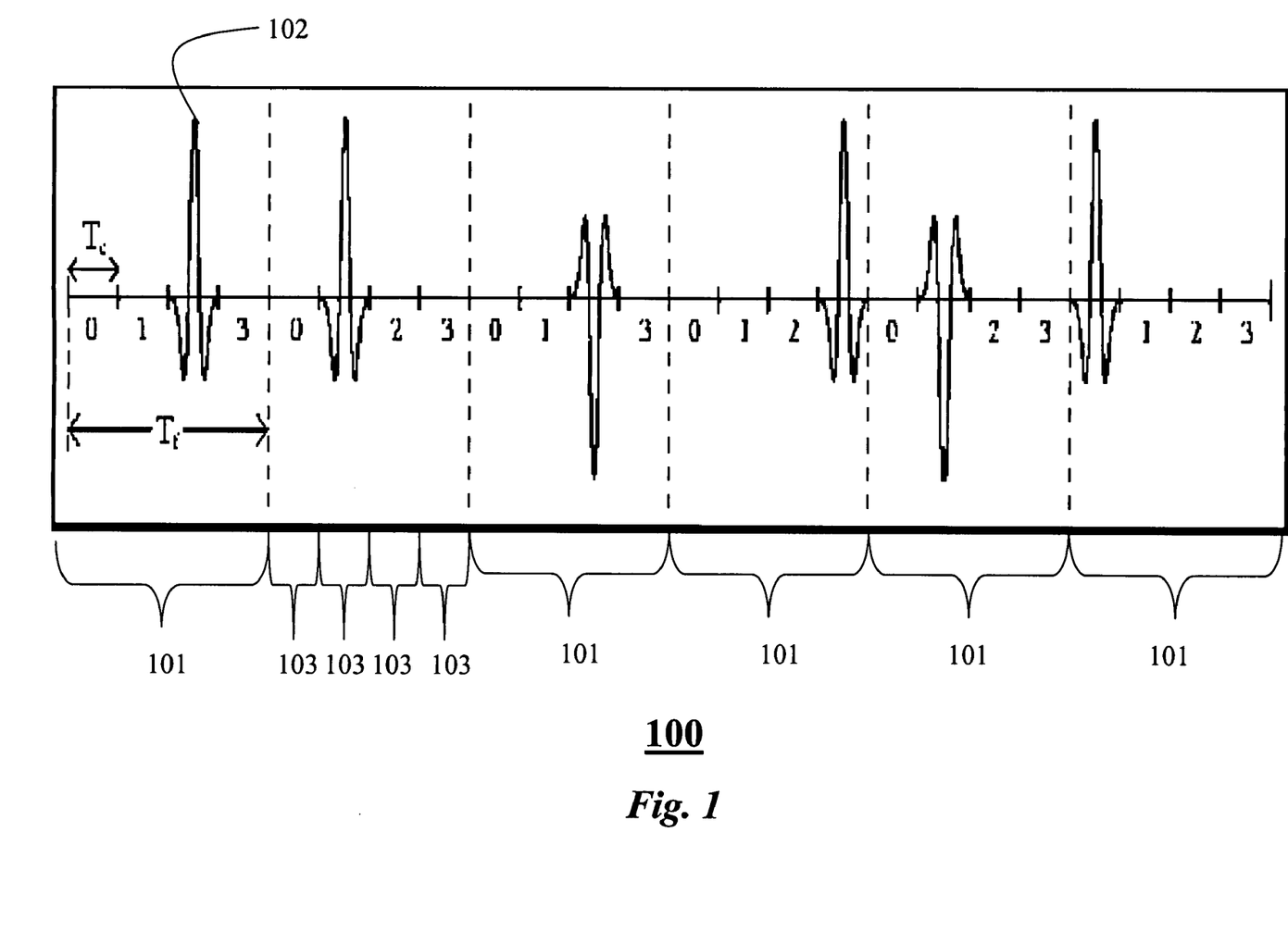
FIG. 1 is timing diagram of pulses processed by a receiver according to the invention.

FIG. 1 shows an example time-hopping impulse radio signal 100 with pulse-based polarity randomization processed according to the invention. Each symbol is transmitted as a set of frames. In FIG. 1, the number of frames $N_f$ in a set of frames is six, with a frame time of $T_f$ each. There is one pulse 102 in each frame 101. The number of chips Nc 103 for each frame is four, labeled $\{0, 1, 2, 3\}$, with a chip time of $T_c$. The pulses are 'spread' over the set of frames according to a time-hopping sequence c, and polarity codes d. In the example shown, the time hopping sequence c is $\{2,1,2,3,1,0\}$, and the polarity codes d are $\{+1,+1,-1,+1,-1,+1\}$.

Signals from a transmitter k are represented by $$s_{tx}^{(k)}(t) = \sqrt{\frac{E_k}{N_f}} \sum_{j=-\infty}^{\infty} d_j^{(k)} b_{\lfloor j/N_f \rfloor}^{(k)} p_{tx}(t - jT_f - c_j^{(k)} T_c), \quad (1)$$

where $p_{tx}(t)$ is a transmitted UWB pulse. A variable $E_k$ is a bit energy of the transmitter k. An average pulse repetition time, also called the 'frame' time, is $T_f$. The number of frames or pulse representing one information symbol b is $N_f$, and $b_{\lfloor j/N_f \rfloor}^{(k)} \in \{+1, -1\}$ is a binary information symbol transmitted by the transmitter k.

In order to enable a channel to be shared by multiple transmitters, and to avoid catastrophic collisions, a time-hopping (TH) sequence $\{c^{(k)}_j\}$, where $c^{(k)}_j \in \{0,1,\ldots,N_c-1\}$ is assigned to each transmitter, where $N_c$ is the number of chips.

This TH sequence provides an additional time shift of $c^{(k)}_j T_c$ seconds to the $j^{th}$ pulse of the $k^{th}$ transmitter, where $T_c$ is a chip interval, which is selected to satisfy $T_c \leq N_c$ in order to prevent adjacent pulses from overlapping.

Random polarity codes $d^{(k)}_j$ are binary random variables taking values ±1 with equal probability, see E. Fishler and H. V. Poor, "On the tradeoff between two types of processing gain," 40th Annual Allerton Conference on Communication, Control, and Computing, October 2002, S. Gezici, H. Kobayashi, H. V. Poor, and A. F. Molisch, "Performance Evaluation of Impulse Radio UWB Systems with Pulse-Based Polarity Randomization in Asynchronous Multiuser Environments," IEEE Wireless Communications and Networking Conference (WCNC'04), March 2004, and Y.-P. Nakache and A. F. Molisch, "Spectral shape of UWB signals influence of modulation format, multiple access scheme and pulse shape," Proceedings of the IEEE Vehicular Technology Conference, (VTC 2003-Spring), vol. 4, pp. 2510-2514, April 2003. However, the use of random polarity codes is not necessary for the applicability of our invention.

Assuming a tapped-delay-line channel model with multipath resolution of the chip interval $T_c$, a discrete channel model $\alpha^{(k)} = [\alpha^{(k)}_1, \ldots, \alpha^{(k)}_L]$ is adopted for transmitter k, where L is assumed, without loss of generality, to be the number of multipath components for each transmitter. By multipath components, we mean only the significant multipath components, i.e., components with a signal strength greater than a predetermined threshold.

Thus, there are $N_f$ frames per symbol, and each frame contains one pulse. Furthermore, each pulse gives rise to multiple echoes or multipath components. In the receiver, each pulse is associated with L samples. Therefore, there can be up to $N_f \times L$ samples to be processed, as described below.

Figure 2:
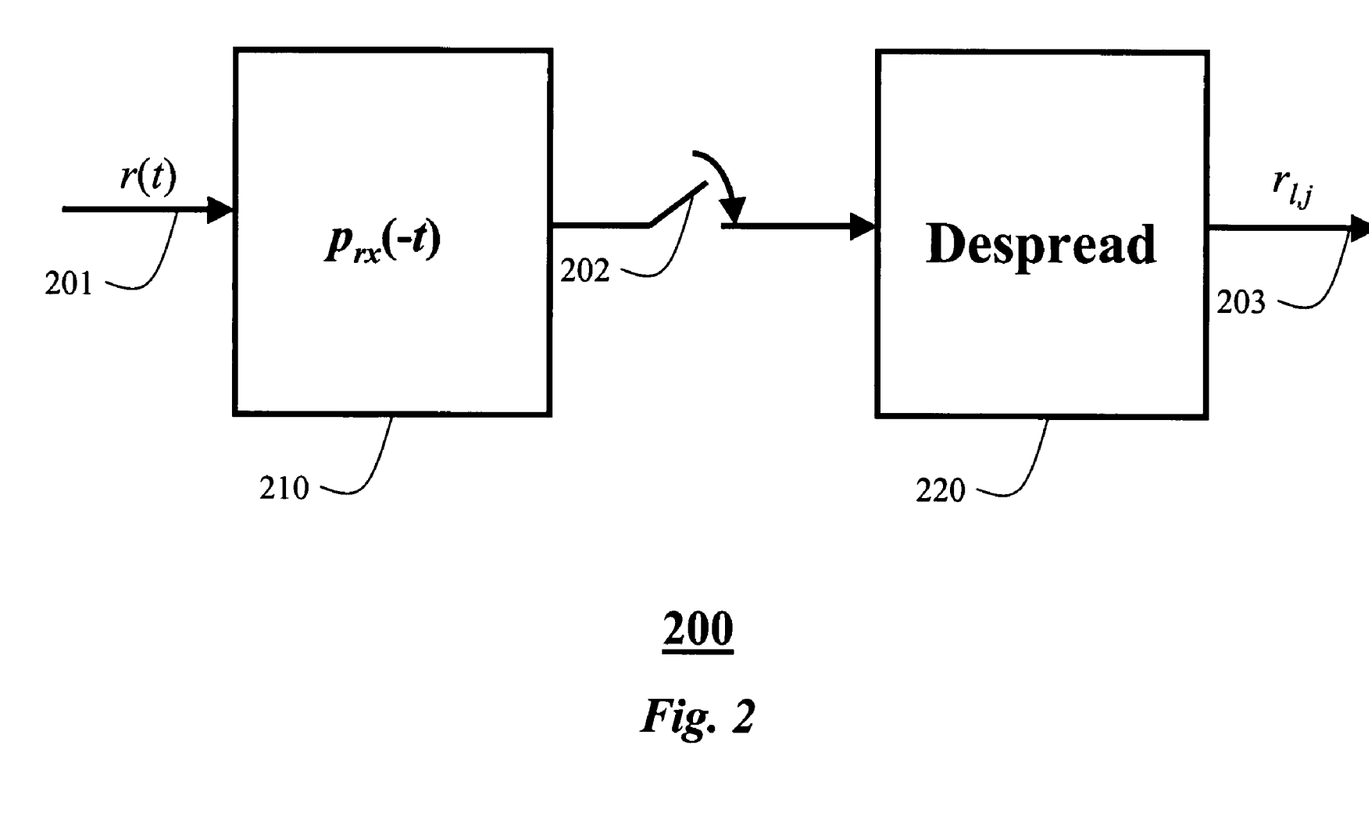
FIG. 2 is a block diagram of front-end of a receiver according to the invention.

FIG. 2 shows a front-end of a receiver 200 according to the invention. The received signal r(t) 201 can be expressed as $$r(t) = \sum_{k=1}^{K} \sqrt{\frac{E_k}{N_f}} \sum_{j=-\infty}^{\infty} \sum_{l=1}^{L} \alpha_l^{(k)} d_j^{(k)} b_{\lfloor j/N_f \rfloor}^{(k)} p_{rx}(t - jT_f - c_j^{(k)}T_c - (l-1)T_c) + \sigma_n n(t), \quad (2)$$

where $p_{rx}(t)$ is a received unit-energy UWB pulse, and n(t) is a zero mean white Gaussian noise with unit spectral density. Consider a filter 210 matched to the UWB pulse $p_{rx}(t)$, as shown in FIG. 2.

The output of this filter is sampled 202 at instants when signals via paths $l \in L$ arrive in each frame, where $L = \{l_1, \ldots, l_M\}$ with $M \leq L$. Due to possible collisions, the actual number N of total samples $r_{l,j}$ 103 per information symbol can be smaller than $N_f M$. The samples at the output of the matched filter are despread 220 according to the polarity code d of the transmitter. In the context of IR systems, spreading and despreading by random polarity codes d are not intended for expanding the bandwidth of the signal. The spreading mainly helps reduce the effect of multiple-access interference (MAI) and eliminate the spectral lines.

The discrete signal at the $l^{th}$ path of the $j^{th}$ frame can be expressed, for the $i^{th}$ information bit, as $$r_{l,j} = s_{l,j}^T A b_i + n_{l,j}, \quad (3)$$

for $l = l_1, \ldots, l_M$, and $j = iN_f, \ldots, (i+1)N_f - 1$, where $$A = \text{diag}\{\sqrt{E_1/N_f}, \ldots, \sqrt{E_k/N_f}\},$$

$$b_i = [b_i^{(1)}, \ldots, b_i^{(K)}]^T, \text{ and}$$

where $n_{l,j} \sim N(0, \sigma_n^2)$. $s_{l,j}$ is a K×1 vector, which can be expressed as a sum of the desired signal part (SP), interframe interference (IFI) and multiple-access interference (MAI) terms:

$$s_{l,j} = s_{l,j}^{(SP)} + s_{l,j}^{(IFI)} + s_{l,j}^{(MAI)}, \quad (4)$$

where the $k^{th}$ elements can be expressed as $$[s_{l,j}^{(SP)}]_k = \begin{cases} \alpha_l^{(1)}, & k = 1 \\ 0, & k = 2, \ldots, K \end{cases}, \quad (5)$$

$$[s_{l,j}^{(IFI)}]_k = \begin{cases} d_j^{(1)} \sum_{(n,m) \in A_{l,j}} d_m^{(1)} \alpha_n^{(1)}, & k = 1 \\ 0, & k = 2, \ldots, K \end{cases}, \quad (6)$$

$$[s_{l,j}^{(MAI)}]_k = \begin{cases} 0, & k = 1 \\ d_j^{(1)} \sum_{(n,m) \in B_{l,j}^{(k)}} d_m^{(k)} \alpha_n^{(k)}, & k = 2, \ldots, K \end{cases}, \quad (7)$$

with $$A_{l,j} = \{(n, m): n \in \{1, \ldots, L\}, m \in F_i, m \neq j, mT_f + c_m^{(1)}T_c + nT_c = jT_f + c_j^{(1)}T_c + lT_c\} \quad (8)$$

and $$B_{l,j}^{(k)} = \{(n, m): n \in \{1, \ldots, L\}, m \in F_i, mT_f + c_m^{(k)}T_c + nT_c = jT_f + c_j^{(1)}T_c + lT_c\}, \quad (9)$$

where $$F_i = \{iN_f, \ldots, (i+1)N_f - 1\}.$$

Note that $A_{l,j}$ is the set of frame and multipath indices of pulses from one transmitter, which originate from a frame different from the $j^{th}$ one and collide with the $l^{th}$ path of the $j^{th}$ pulse of the transmitter.

Similarly, $B^{(k)}_{l,j}$ is the set of frame and path indices of pulses from transmitter k that collide with the $l^{th}$ path of the $j^{th}$ pulse of the transmitter.

For simplicity of this description, we assume a guard interval between information symbols that is equal to the length of the channel impulse response (CIR), which avoids inter-symbol interference (ISI). However, this is not required for the invention to work.

Therefore, for bit i, we only consider interference from pulses in the set of frames of the current symbol i, namely from the pulses in the set of frames $iN_f, \ldots, (i+1)N_f - 1$.

Linear MMSE Receiver

Figure 3:
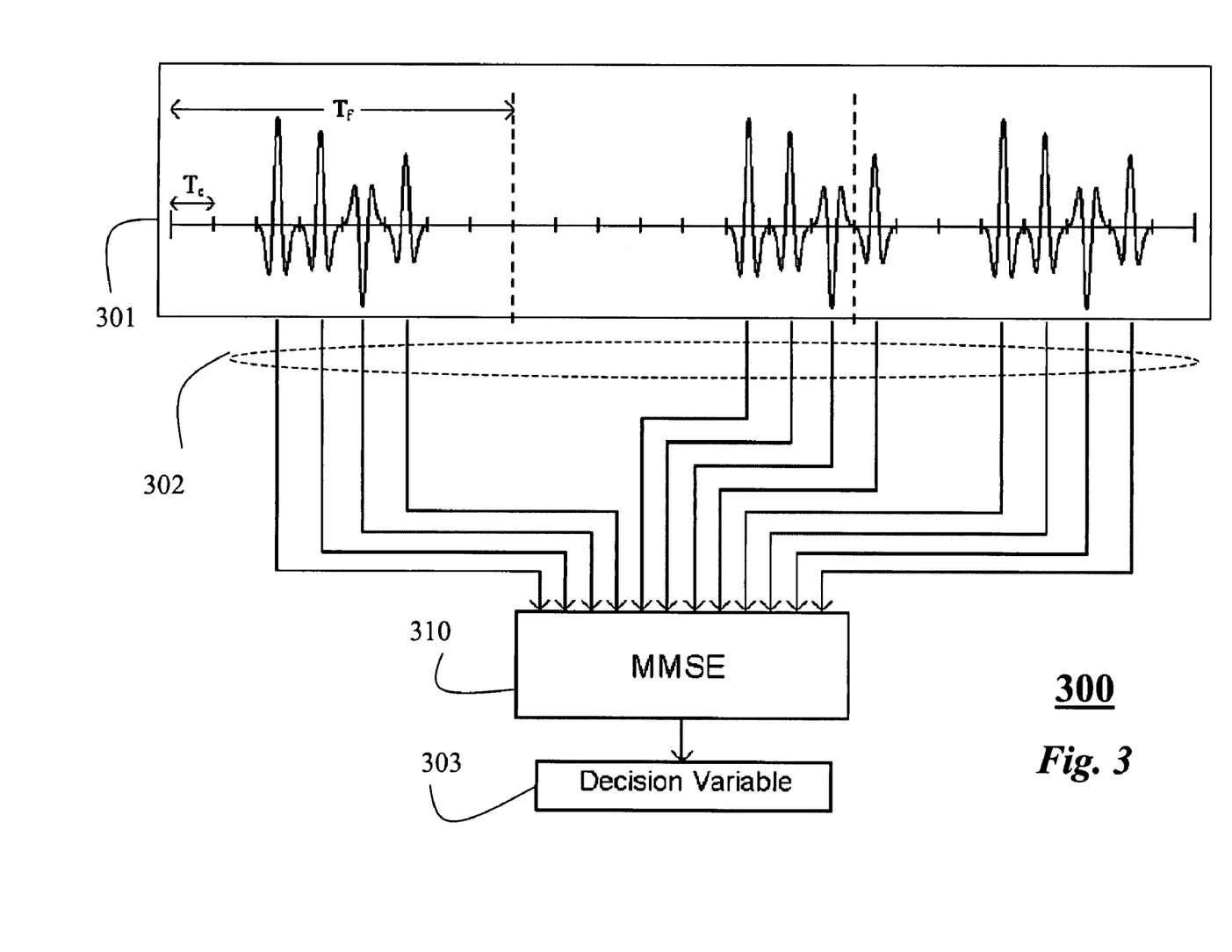
FIG. 3 is a block diagram of a front-end of an optimal linear receiver according to the invention.

As shown in FIG. 3, we first describe a linear receiver 300 that combines 310 all samples 302 of all frames of a received signal 301 optimally, according to a minimum mean square error MMSE criterion. In MMSE the coefficients are those that minimizes the MSE between the information bit and a decision variable 303. Calculating MMSE coefficients involves the inversion of a matrix.

Let r be an N×1 vector denoting the distinct samples $r_{l,j}$ for $(l, j) \in L \times \{1, \ldots, N_f\}$:

$$r = [r_{l_1, j_1^{(1)}} \cdots r_{l_1, j_{m_1}^{(1)}} \cdots r_{l_M, j_1^{(M)}} \cdots r_{l_M, j_{m_M}^{(M)}}]^T, \quad (10)$$

where $\sum_{i=1}^{M} m_i = N$ denotes the total number of samples, with $N \leq MN_f$.

Using equation (3), r can be expressed as $$r = SAb_i + n, \quad (11)$$

where A and $b_i$ are as in equation (3) and $n \sim N(0, \sigma_n^2 I)$. The signature matrix is S, which has $s^T_{l,j}$ for $(l,j) \in C$ as its rows, where $$C = \{(l_1, j^{(1)}_1), \ldots, (l_1, j^{(1)}_{m_1}), \ldots, (l_M, j^{(M)}_1), \ldots, (l_M, j^{(M)}_{m_M})\}.$$

From equations (4)-(7), the matrix S can be expressed as $$S = S^{(SP)} + S^{(IFI)} + S^{(MAI)}.$$

Then, after some manipulations, r becomes $$r = b_i^{(1)} \sqrt{\frac{E_1}{N_f}} (\alpha + e) + S^{(MAI)} A b_i + n, \quad (12)$$

where $\alpha = [\alpha^{(1)}_{l_1} 1^T_{m_1}, \ldots, \alpha^{(1)}_{l_M} 1^T_{m_M}]^T$, with $1_m$ denoting an $m \times 1$ vector of all ones, and e is an $N \times 1$ vector whose elements are $$e_{l,j} = d_j^{(1)} \sum_{(n,m) \in A_{l,j}} d_m^{(1)} \alpha_n^{(1)} \text{ for } (l, j) \in C.$$

The linear receiver combines the elements of r, and obtains a decision variable as follows:

$$y_1 = \theta^T r, \quad (13)$$

where $\theta$ is a weighting vector.

The MMSE weights that maximize the signal to interference plus noise ratio (SINR) of the received signal in equation (12) can be obtained as $$\theta_{MMSE} = R_{w_1}^{-1}(\alpha + e) \quad (14)$$

where $w = S^{(MAI)} A b_i + n$ and $R_{w_1} = E\{w_1 w^T_1\}$. Assuming equiprobable information symbols, the correlation matrix can be expressed as $$R_{w_1} = S^{(MAI)} A^2 (S^{(MAI)})^T + \sigma_n^2 I. \quad (15)$$

Then, the linear MMSE receiver 300 becomes $$\hat{b}_i^{(1)} = \text{sign}\{r^T R_{w_1}^{-1}(\alpha + e)\}. \quad (16)$$

Note that this receiver requires the inversion of an $N \times N$ matrix ($N \leq MN_f$). Hence, the receiver can be complex in some situations. Therefore, we also describe suboptimal linear receivers below.

Optimal Frame Combining (OFC)

Figure 4:
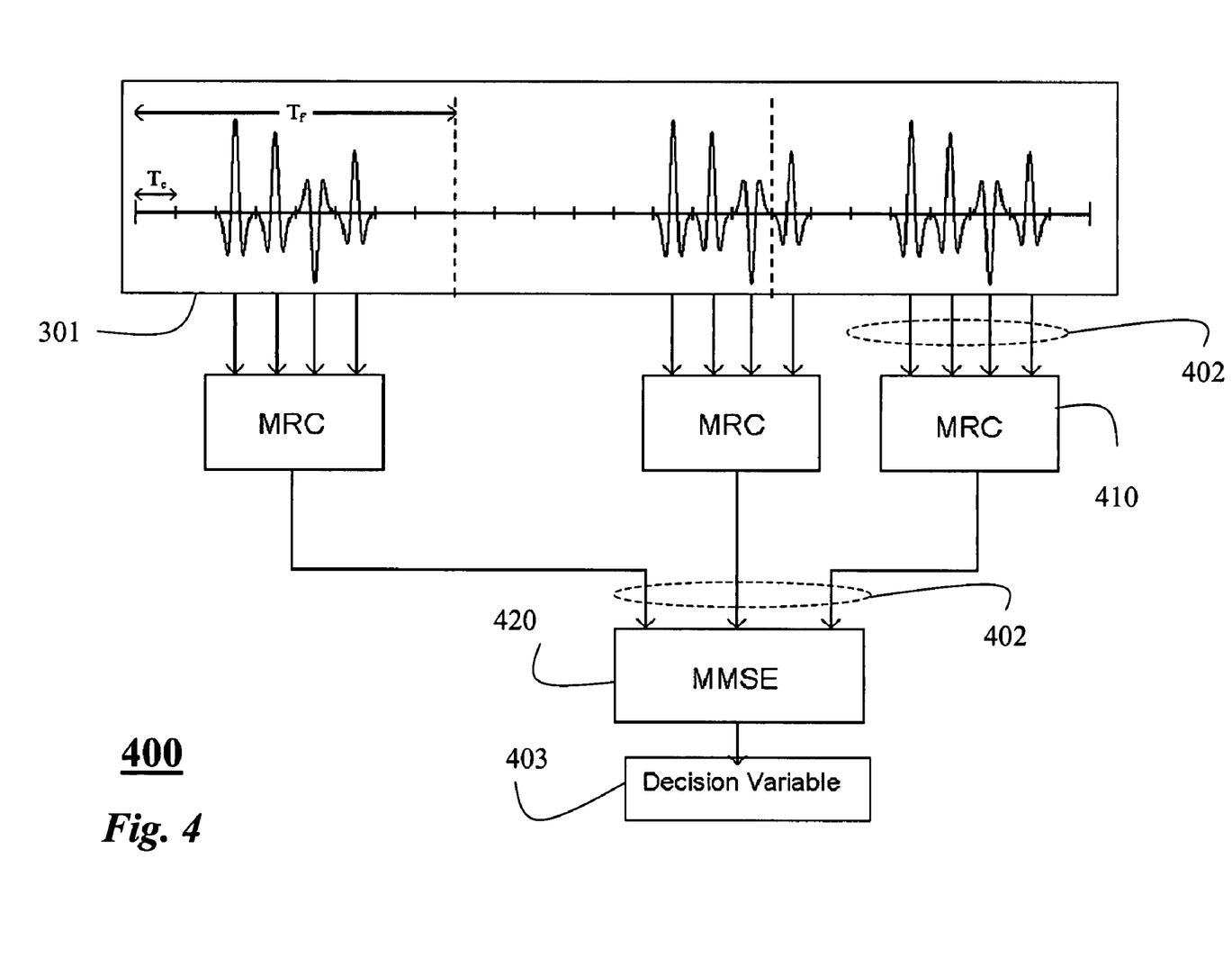
FIG. 4 is a block diagram of a front-end of an optimal an optimal frame combining receiver according to the invention.

FIG. 4 shows a an optimal frame combining (OFC) receiver 400 according to our invention. In this case, samples 402 from multipath components in each frame in the set are first combined 410 according to a maximal ratio combining (MRC) criterion. In this case, each sample is multiplied by a complex conjugate of the channel coefficient value, and then the samples are added.

Then, those combined samples 403 of all of the frames are recombined 420 according to the MMSE criterion. That is, the decision variable 403 is given by $$y_2 \sum_{j=iN_f}^{(i+1)N_f - 1} \gamma_j \sum_{l \in L} \alpha_l^{*(1)} r_{l,j} \quad (17)$$

where $\gamma_{iN_f}, \ldots, \gamma_{(i+1)N_f-1}$ are the weighting factors for the $i^{th}$ bit, and $\alpha^*$ is the complex-conjugated path weight.

From equation (3), $y_2$ can be expressed as $$y_2 = \gamma_i^T \left( \sum_{l \in L} \alpha_l^{(1)} \hat{S}_l A b_i + \sum_{l \in L} \alpha_l^{(1)} \hat{n}_l \right), \quad (18)$$

where $\gamma_i = [\gamma_{iN_f}, \ldots, \gamma_{(i+1)N_f-1}]^T$ is the vector of weighting coefficients, $$\hat{n}_l = [n_{l,iN_f} \ldots n_{l,(i+1)N_f-1}]^T$$

is the noise vector, which is distributed as $N(0, \sigma_n^2 I)$, and $\hat{S}_l$ is an $N_f \times K$ matrix, whose $j^{th}$ row is $s^T_{l,iN_f+j-1}$. Using equations (4)-(7), $\hat{S}$ can be expressed as $$\hat{S} = \hat{S}^{(SP)} + \hat{S}^{(IFI)} + \hat{S}^{(MAI)}.$$

Then, we obtain $$y_2 = \gamma_i^T \left( b_i^{(1)} \sqrt{\frac{E_1}{N_f}} \left[ \sum_{l \in L} (\alpha_l^{(1)})^2 1_{N_f} + \sum_{l \in L} \alpha_l^{(1)} \hat{e}_l \right] + w_2 \right), \quad (19)$$

where $\hat{e}_l$ is an $N_f \times 1$ vector whose $j^{th}$ element is $e_{l,iN_f+j-1}$, and $$w_2 = \sum_{l \in L} \alpha_l^{(1)} \hat{S}_l^{(MAI)} A b_i + \sum_{l \in L} \alpha_l^{(1)} \hat{n}_l.$$

From equation (19), the MMSE weights can be obtained as $$\gamma 1_{MMSE} = R_{w_2}^{-1} \left( \sum_{l \in L} (\alpha_l^{(1)})^2 1_{N_f} + \sum_{l \in L} \alpha_l^{(1)} \hat{e}_l \right), \quad (20)$$

where $$R_{w_2} = \sum_{l \in L} \alpha_l^{(1)} \hat{S}_l^{(MAI)} A^2 \sum_{l \in L} \alpha_l^{(1)} (\hat{S}_l^{(MAI)})^T + \sum_{l_1 \in L} \sum_{l_2 \in L} \alpha_{l_1}^{(1)} \alpha_{l_2}^{(1)} E\{\hat{n}_{l_1} \hat{n}_{l_2}^T\}. \quad (21)$$

It is straightforward to show that $E\{\hat{n}_{l_1} \hat{n}_{l_2}^T\} = \sigma_n^2 I$ for $l_1 = l_2$. When $l_1 \neq l_2$, the element at row $j_1$ and column $j_2$, $[\{\hat{n}_{l_1} \hat{n}_{l_2}^T\}]_{j_1, j_2}$, is equal to $\sigma_n^2$ if $$j_1 N_c + c^{(1)}_{j_1} + l_1 = j_2 N_c + c^{(1)}_{j_2} + l_2, \text{ and zero otherwise}$$

$$j_1 = iN_f, \ldots, (i+1)N_f - 1, \text{ and } j_2 = iN_f, \ldots, (i+1)N_f - 1.$$

We note from equations (19) and (20) that the OFC receiver, $\hat{b}_i^{(1)} = \text{sign}\{y_2\}$, requires an inversion of an $N_f \times N_f$ matrix.

The reduction in complexity compared to the optimal linear MMSE receiver is due to the suboptimal combination of the multipath components. The SINR of the system can be expressed as $$SINR_{OFC} = \frac{E_1}{N_f} x_2^T R_{w_2}^{-1} x_2. \quad (22)$$

where

-continued $$x_2 = \sum_{l \in L} (\alpha_l^{(1)})^2 1_{N_f} + \sum_{l \in L} \alpha_l^{(1)} \hat{e}_1.$$

Optimal Multipath Combining

Figure 5:
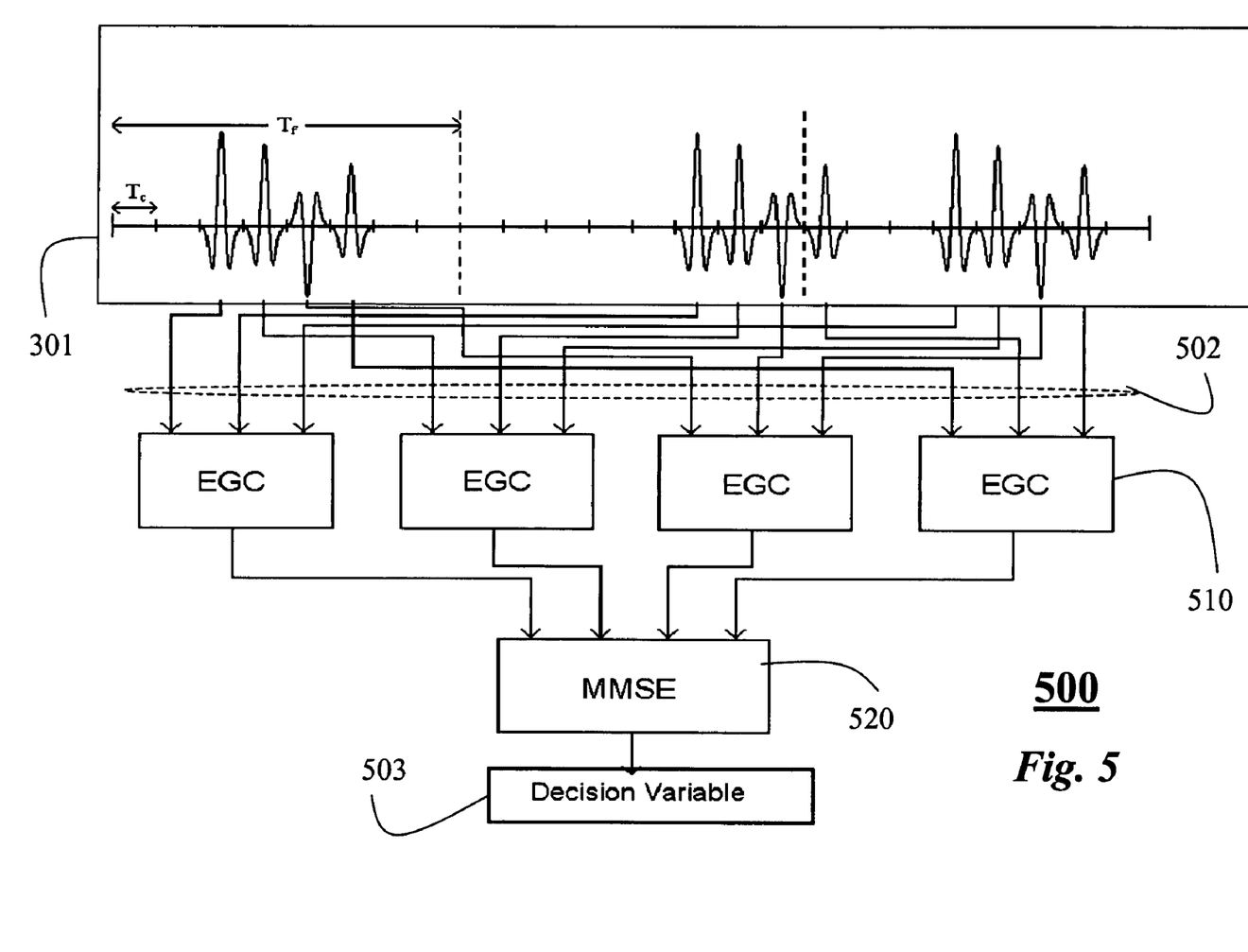
FIG. 5 is a block diagram of a front-end of an optimal multipath combining receiver according to the invention.

With reference to FIG. 5, we now describe an optimal multipath combining (OMC) receiver 500 that recombines 520 different multipath components optimally according to the MMSE criterion, while employing equal gain combining (EGC) 510 for contributions from different frames.

In EGC, the samples 502 are added directly. In this case, the decision variable 503 is given by $$y_3 = \sum_{l \in \mathcal{L}} \beta_l \sum_{j=iN_f}^{(i+1)N_f - 1} r_{l,j}, \quad (23)$$

where $\beta = [\beta_{l_1}, \ldots, \beta_{l_M}]^T$ is a weighting vector.

Using equation (3), $y_3$ can be expressed as $$y_3 = \beta^T \left( \sum_{j=iN_f}^{(i+1)N_f - 1} [\tilde{S}_j A b_i + \tilde{n}_j] \right), \quad (24)$$

where $\tilde{n}_j = [n_{l_1,j} \ldots n_{l_M,j}]^T$ is the noise vector, and $\tilde{S}_j$ is an M×K signature matrix, whose $m^{th}$ row is $s^T_{l_m,j}$. Using equations (4)-(7), $\tilde{S}$ can be expressed as $$\tilde{S} = \tilde{S}^{(SP)} + \tilde{S}^{(IFI)} + \tilde{S}^{(MAI)}.$$

Then, we obtain where $\tilde{\alpha} = [\tilde{\alpha}^{(1)}_{l_1} \ldots + \tilde{\alpha}^{(1)}_{l_M}]^T$, $\tilde{e}_j$ is an M×1 vector whose $m^{th}$ element is $$e_{l_m,j} = d_j^{(1)} \sum_{(n,m) \in A_{l_m,j}} d_m^{(1)} \alpha_n^{(1)}, \text{ and} \quad (25)$$

$$w_3 = \sum_{j=iN_f}^{(i+1)N_f - 1} \tilde{S}_j^{(MAI)} A b_i + \sum_{j=iN_f}^{(i+1)N_f - 1} \tilde{n}_j.$$

From equation (25), the MMSE weights are selected as $$y_3 = \beta^T \left[ b_i^{(1)} \sqrt{\frac{E_1}{N_f}} \left( N_f \tilde{\alpha} + \sum_{j=iN_f}^{(i+1)N_f - 1} \tilde{e}_j \right) + w_3 \right], \quad (26)$$

where $$R_{w_3} = \quad (27)$$

$$\sum_{j=iN_f}^{(i+1)N_f - 1} \tilde{S}_j^{(MAI)} A^2 \sum_{j=iN_f}^{(i+1)N_f - 1} (\tilde{S}_j^{(MAI)})^T + \sum_{j_1=iN_f}^{(i+1)N_f - 1} \sum_{j_2=iN_f}^{(i+1)N_f - 1} E\{\tilde{n}_{j_1} \tilde{n}_{j_2}^T\}.$$

It can be observed that $E\{\tilde{n}_{j_1} \tilde{n}_{j_2}^T\} = \sigma_n^2 I$ for $j_1 = j_2$. When $j_1 \neq j_2$, the element at row $l_1$ and column $l_2$, $E\{\tilde{n}_{j_1} \tilde{n}_{j_2}^T\}_{l_1, l_2}$, is equal to $\sigma_n^2$ if $l_1 N_c + c^{(1)}_{l_1} + j_1 = l_2 N_c + c^{(1)}_{l_2} + j_2$, and zero otherwise.

We note from equations (25) and (26) that the OMC receiver 500 needs to invert the M×M matrix $R_{w_3}$.

The reduction in the complexity compared to the optimal linear receiver described above is the result of suboptimal combination of the contributions from different frames.

The SINR of the system can be expressed as $$SINR_{OMC} = \frac{E_1}{N_f} x_3^T R_{w_3}^{-1} x_3. \quad (28)$$

where $$x_3 = N_f \tilde{\alpha} + \sum_{j=iN_f}^{(i+1)N_f - 1} \tilde{e}_j.$$

Adaptive Receiver Structure

A receiver can adaptively select between the OFC and the OMC modes for the first combining according to the following criterion:

select the OFC if $SINR_{OFC} \geq SINR_{OMC}$; and
select the OMC if $SINR_{OFC} < SINR_{OMC}$.

Depending on the channel state and the interference, the selected mode, i.e., OFC or OMC, can change. The selected mode can also be based on the number of frames, and the number of significant multipath components. This information can be obtained from averaged channel-state information. If the number of frames is larger than the number of significant multipath components, then OFC is selected, otherwise, OMC is selected.

The receiver can also include a structure for inverting a matrix of a fixed or maximum size $N_m \times N_m$. In that case, it is best to generate exactly $N_m$ intermediate variables γ, either by OFC or OMC. These intermediate variables can then be recombined in according to the MMSE criterion. The recombining requires the matrix inversion. For example, if $N_m$ is 20, Nf is 10, and L is 4, then it is best to perform maximum-ratio combining of exactly two multipath components, so that a total of 20 intermediate variables, i.e., two per frame, are available for combination by the MMSE.

If there is a constraint on the size of the matrix inversion employed for the MMSE recombining part, the receiver can again use OFC/OMC modes accordingly in order to satisfy the complexity constraint on the MMSE combining due to matrix inversion.

EFFECT OF THE INVENTION

The invention provides optimal and suboptimal linear receivers for TH-IR systems. The optimal linear receiver performs MMSE combining of all the received samples. This receiver yields the best bit error probability (BEP) performance, but with a high complexity.

Therefore, the invention also provides an OFC receiver, which combines the contributions from the set of frames optimally, while performing MRC for the received multipath components.

An OMC receiver combines the components from different frames with equal weight while using the MMSE criterion for the multipath components.

Depending on the system parameters, either the OMC mode or the OFC mode can be selected adaptively.

Figure 6:
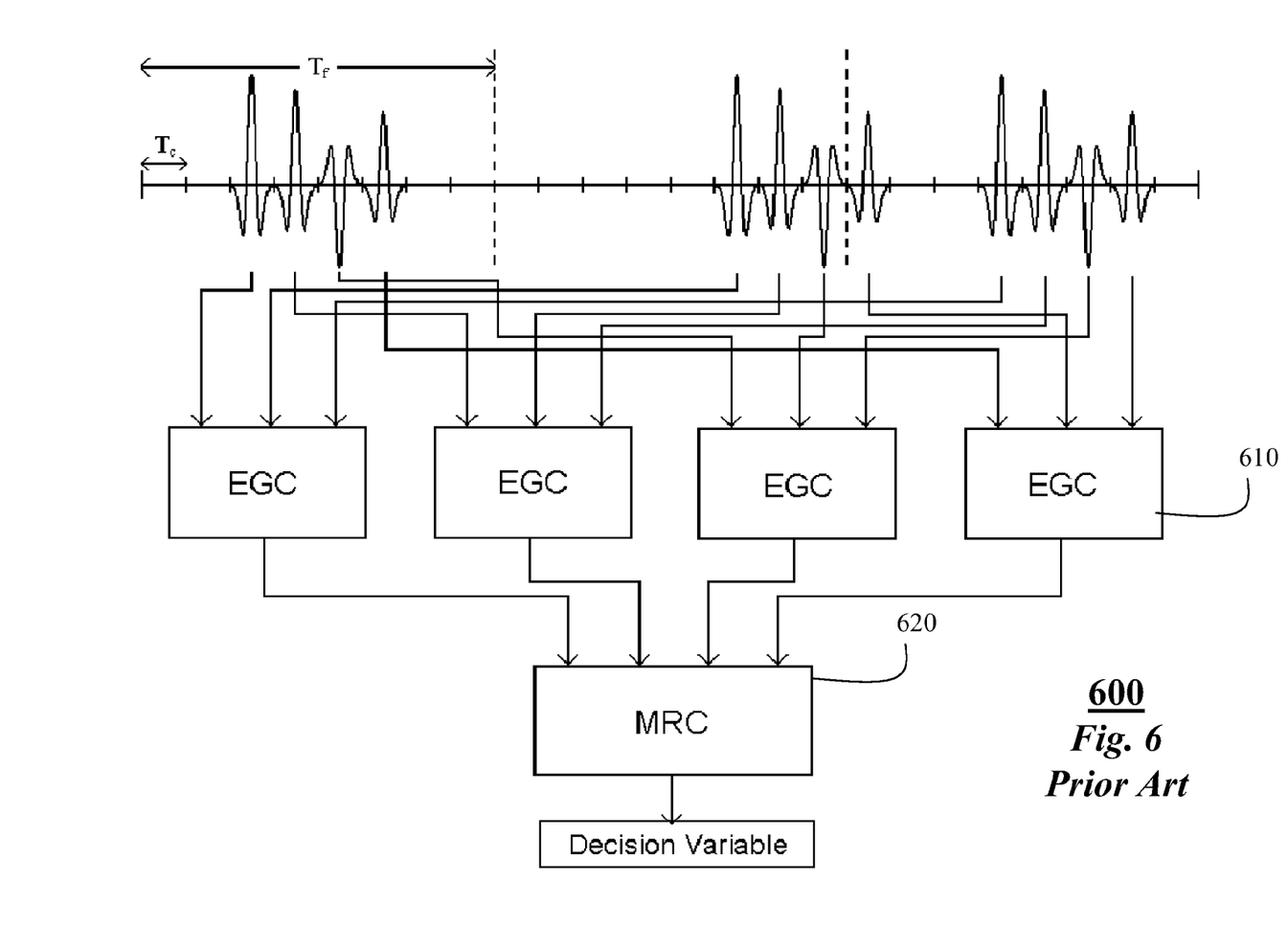
FIG. 6 is a block diagram of a front end of a prior art receiver.

For comparison, FIG. 6 shows a typical prior art receiver that processes samples of the received signal in two stages, first according to the equal gain criterion 610 and then according to the mean ratio criterion 620.

It is to be understood that various other adaptations and modifications may be made within the spirit and scope of the invention. Therefore, it is the object of the appended claims to cover all such variations and modifications as come within the true spirit and scope of the invention.

We claim:

1. A linear receiver for a time-hopped impulse radio system in which each symbol is transmitted over a channel having different multipath components as a set of $N_f$ frames, each frame including one pulse, comprising:

means for sampling all frames of a received signal corresponding to the symbol to generate $N_f \times L$ samples, where L is a number of samples for each frame; and means for combining the $N_f \times L$ samples according to a minimum mean square error criterion to obtain a decision variable corresponding to the symbol, in which the means for combining further comprises:

means for selecting adaptively between equal gain combining and maximum ratio combining, in which the equal gain combining first combines the L samples of each frame according to an equal gain criterion to generate $N_f$ combined samples, and the $N_f$ combined samples are then recombined according to the minimum mean square error criterion to obtain the decision variable corresponding to the symbol, and in which the maximum ratio combining first combines samples of multipath components of each of the $N_f$ frames according to a maximum ratio gain criterion to generate combined samples, and the combined samples are then recombined according to the minimum mean square error criterion to obtain the decision variable corresponding to the symbol.

2. A method for recovering symbols in a time-hopped impulse radio system as a set of $N_f$ frames, each frame including one pulse, comprising:

sampling all frames of a received signal corresponding to the symbol to generate $N_f \times L$, where L is a number of samples for each frame; and combining the $N_f \times L$ samples according to a minimum mean square error criterion to obtain a decision variable corresponding to the symbol, in which the combining further comprises:

selecting adaptively between equal gain combining and maximum ratio combining, in which the equal gain combining first combines the L samples of each frame according to an equal gain criterion to generate $N_f$ combined samples, and the $N_f$ combined samples are then recombined according to the minimum mean square error criterion to obtain the decision variable corresponding to the symbol, and in which the maximum ratio combining first combines samples of multipath components of each of the $N_f$ frames according to a maximum ratio gain criterion to generate combined samples, and the combined samples are then recombined according to the minimum mean square error criterion to obtain the decision variable corresponding to the symbol.

3. The method of claim 2 in which the selecting is based on an interference plus noise ratio of the received signal.

4. The method of claim 2, in which the selecting is based on the number of frames and the number of multipath components.

5. The method of claim 4, in which the maximum ratio gain criterion is selected if the number of frames is larger than the number of multipath components, and otherwise the equal gain criterion is selected.

* * * * *